United States Patent
Matsumura et al.

(10) Patent No.: US 10,254,893 B2
(45) Date of Patent: Apr. 9, 2019

(54) OPERATING APPARATUS, CONTROL METHOD THEREFOR, AND STORAGE MEDIUM STORING PROGRAM

(71) Applicant: CANON KABUSHIKI KAISHA, Tokyo (JP)

(72) Inventors: Takeshi Matsumura, Abiko (JP); Soshi Oshima, Toride (JP); Katsuyuki Takahashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 15/385,655

(22) Filed: Dec. 20, 2016

(65) Prior Publication Data
US 2017/0185226 A1 Jun. 29, 2017

(30) Foreign Application Priority Data
Dec. 25, 2015 (JP) .................................. 2015-254870

(51) Int. Cl.
G06F 3/041 (2006.01)
G06F 3/01 (2006.01)
G06F 3/044 (2006.01)

(52) U.S. Cl.
CPC ............ G06F 3/0418 (2013.01); G06F 3/017 (2013.01); G06F 3/044 (2013.01); G06F 3/0416 (2013.01); G06F 2203/04101 (2013.01)

(58) Field of Classification Search
CPC ........ G06F 3/0418; G06F 3/017; G06F 3/044; G06F 2203/04101
See application file for complete search history.

(56) References Cited

U.S. PATENT DOCUMENTS

2015/0317784 A1 11/2015 Oshima et al.
2015/0346911 A1* 12/2015 Christiansson ....... G06F 3/0421
                                                         345/175
2016/0231862 A1* 8/2016 Tretter .................. G06F 3/0416

FOREIGN PATENT DOCUMENTS

JP         2014203174 A    10/2014
WO      2014125482 A1     8/2014

OTHER PUBLICATIONS

Nadia Haubner, et al., "Integrating a Depth Camera in a Tabletop Setup for Gestural Input on and above the Surface," Sep. 1, 2013, http://johannesluderschmidt.de/pdf/IntegratingDepthCameraMultiTouchSystem.pdf.
Jan Riemann, et al., "In-Situ Occlusion Resolution for Hybrid Tabletop Environments," INTERACT 2015, Part III, LNCS 9298 pp. 278-295, 2015.

* cited by examiner

*Primary Examiner* — Peter D McLoone
(74) *Attorney, Agent, or Firm* — Canon USA, Inc., IP Division

(57) ABSTRACT

An image on an operating surface is captured, and first image data are acquired. A gesture performed by a user on the operating surface is recognized on the basis of the first image data. Whether there is a touch panel sensor configured to acquire coordinates of positions touched by an operation performed by a user on the operating surface or not is determined. In a case where the determination unit determines that there is the touch panel sensor on the operating surface, coordinates of the position on the operating surface touched by the operation performed by the user are identified on the basis of coordinates of a position detected by the touch panel sensor instead of a recognized user's gesture.

11 Claims, 15 Drawing Sheets

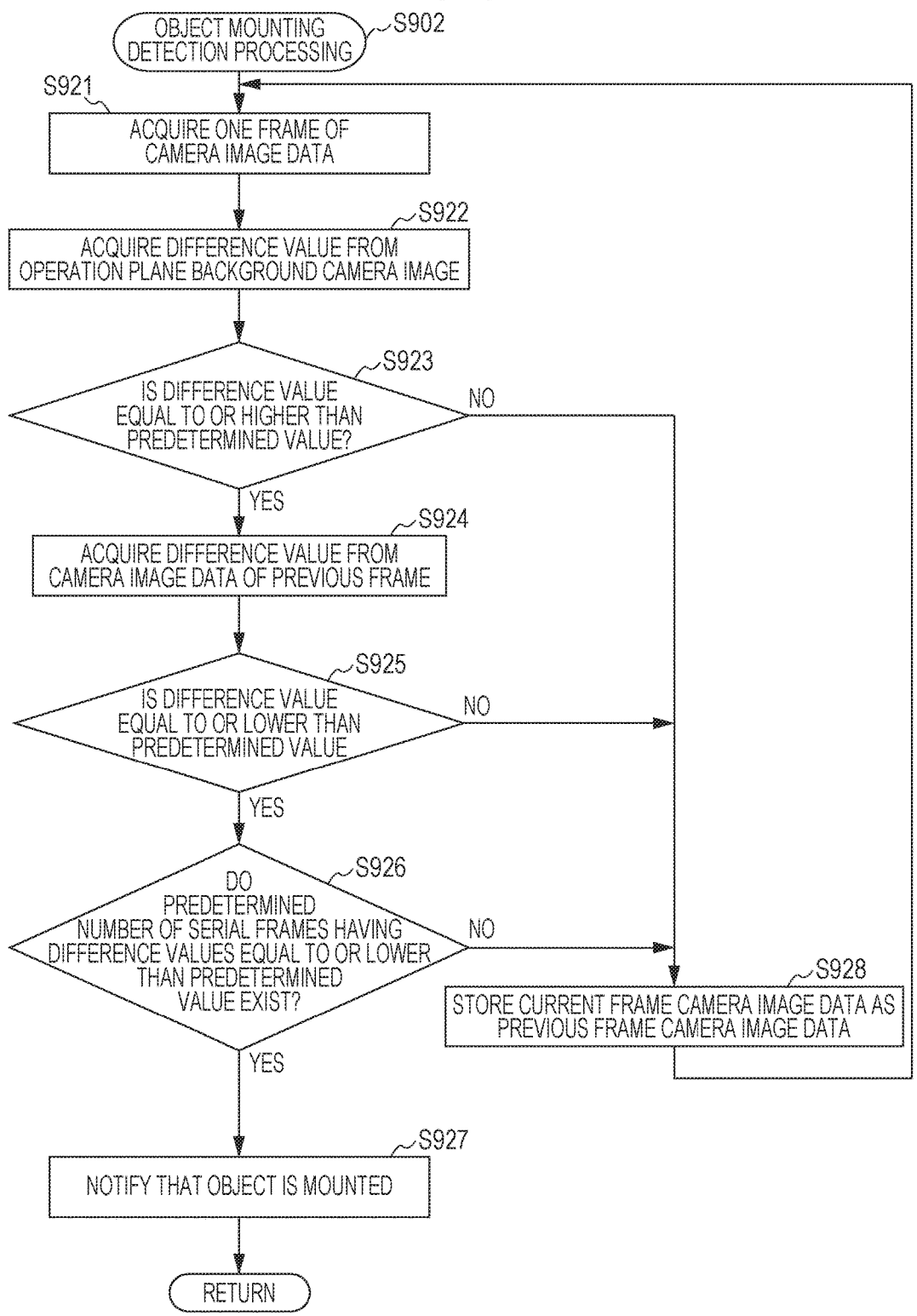

OPERATING APPARATUS, CONTROL METHOD THEREFOR, AND STORAGE MEDIUM STORING PROGRAM

BACKGROUND OF THE INVENTION

Field of the Invention

The present invention relates to an operating apparatus, a control method therefor, and a storage medium storing a program.

Description of the Related Art

A system has been proposed which applies a gesture operation technology detecting a finger of a user by using a visible light camera, an infrared camera, or a three-dimensional distance sensor, for example, for controlling an apparatus in accordance with a motion and position of the finger. For example, Japanese Patent Laid-Open No. 2014-203174 discloses a system in which a projector displays, on a target, an image showing a part where a finger of a user is performing a selection operation in accordance with the three-dimensional coordinates of the finger measured by using a stereo camera. Thus, the user can operate a user interface image displayed by the projector.

However, in a case where three-dimensional coordinates of a finger of a user are detected by using a visible light camera, an infrared camera, a three-dimensional distance sensor or the like, there is a limit to the precision of the detected three-dimensional position. This may disadvantageously cause determination of a part that is not touched by a user as being touched, resulting in a user's unintentional operation on a user interface screen even when the user intends to perform a more detail touch operation on the user interface screen.

The present invention provides a technology which detects, with high precision, a touch operation performed by a user.

SUMMARY OF THE INVENTION

According to an aspect of the present invention, an operating apparatus includes an image acquisition unit configured to capture an image on an operating surface and acquire first image data, a recognition unit configured to recognize a gesture performed by a user on the operating surface on the basis of the first image data, a determination unit configured to determine whether there is a touch panel sensor configured to acquire coordinates of positions touched by an operation performed by a user on the operating surface or not, and a control unit configured to, in a case where the determination unit determines that there is the touch panel sensor on the operating surface, identify coordinates of the position on the operating surface touched by the operation performed by the user on the basis of coordinates of a position detected by the touch panel sensor instead of a user's gesture recognized by the recognition unit.

Further features of the present invention will become apparent from the following description of embodiments with reference to the attached drawings.

BRIEF DESCRIPTION OF THE DRAWINGS

The attached drawings are included in the specification as components and illustrate embodiments of the present invention for describing the principle of the present invention in association with the descriptions in the specification.

FIGS. 9A and 9B are flowcharts illustrating processing in an object detection unit according to the first embodiment.

DESCRIPTION OF THE EMBODIMENTS

Embodiments of the present invention will be described in detail below with reference to the attached drawings. It should be understood that the following embodiments are not intended to limit the claimed invention, and all combinations of features included in the embodiments are not required in the present invention. Each of the embodiments of the present invention described below can be implemented solely or as a combination of a plurality of the embodiments or features thereof where necessary or where the combination of elements or features from individual embodiments in a single embodiment is beneficial. According to an embodiment, a camera scanner will be described, as an example of an operating apparatus according to the present invention, which detects a user's touch operation performed on an object projected on an operating surface by using a capacitive touch panel sensor and a three-dimensional distance sensor in the past.

First Embodiment

Figure 1:
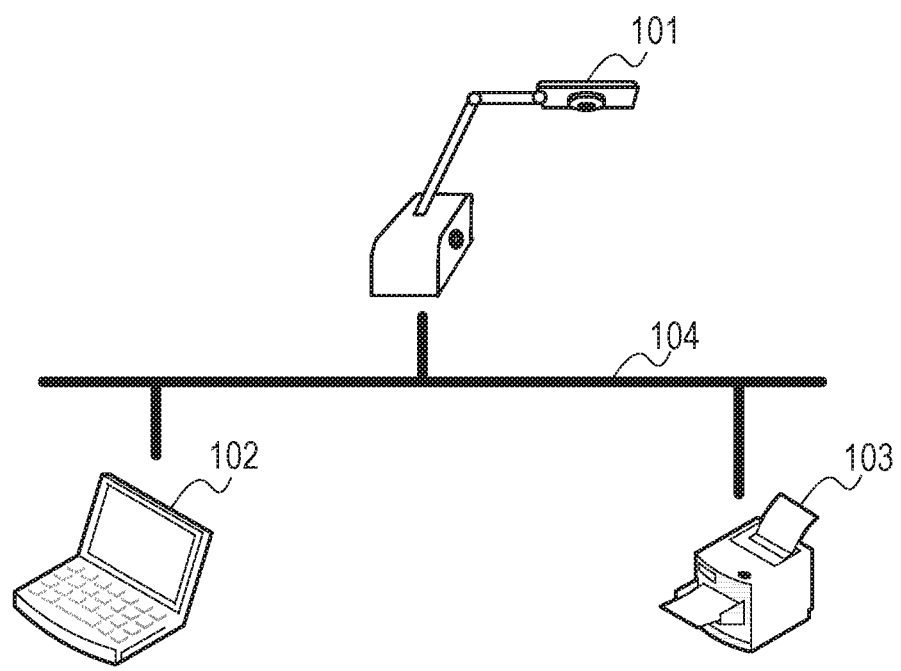
FIG. 1 illustrates a network configuration including a camera scanner according to a first embodiment of the present invention.

FIG. 1 illustrates a network configuration including a camera scanner 101 according to a first embodiment of the present invention.

As illustrated in FIG. 1, the camera scanner 101 is connected to a host computer 102 and a printer 103 via a network 104 such as an Ethernet (registered trademark). In this configuration, in response to instructions from the host computer 102, a scan function and a print function are executed. In the scan function, the camera scanner 101 reads an image of a document. In the print function, the read image data are sent to the printer 103 for printing. Alternatively, without going through the host computer 102, a user may directly instruct the camera scanner 101 to read a document and send the read image data to the printer 103 for printing it.

Figure 2A:
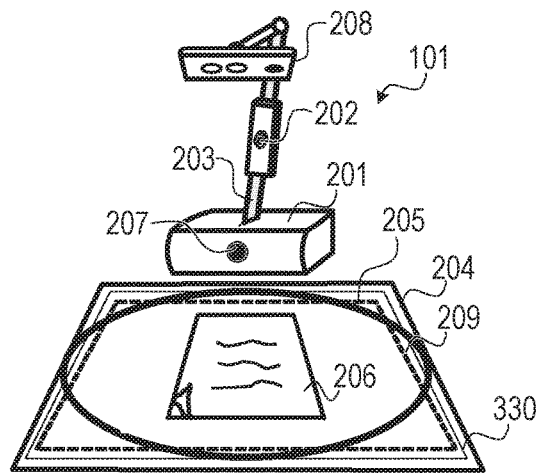
FIGS. 2A to 2C illustrate a configuration of the camera scanner according to the first embodiment.
Figure 2B:
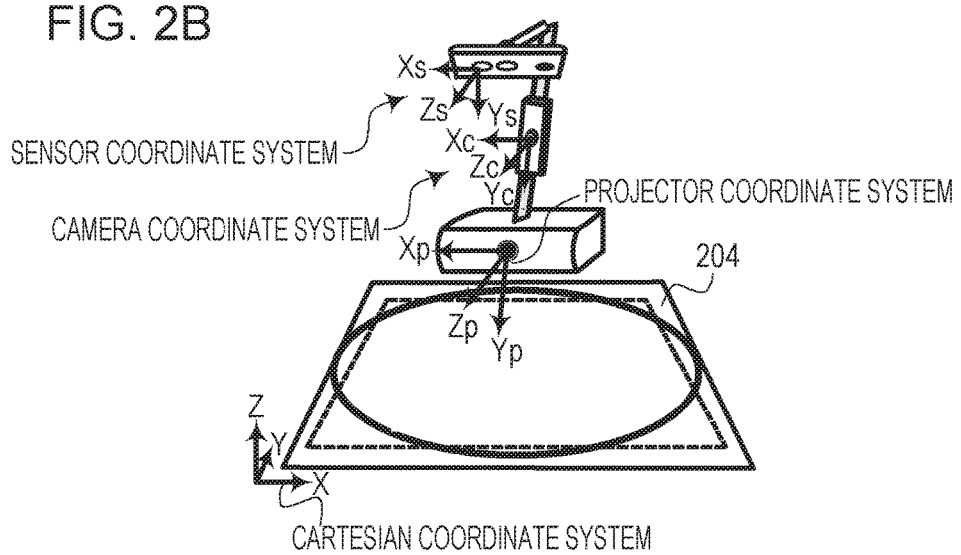
Figure 2C:
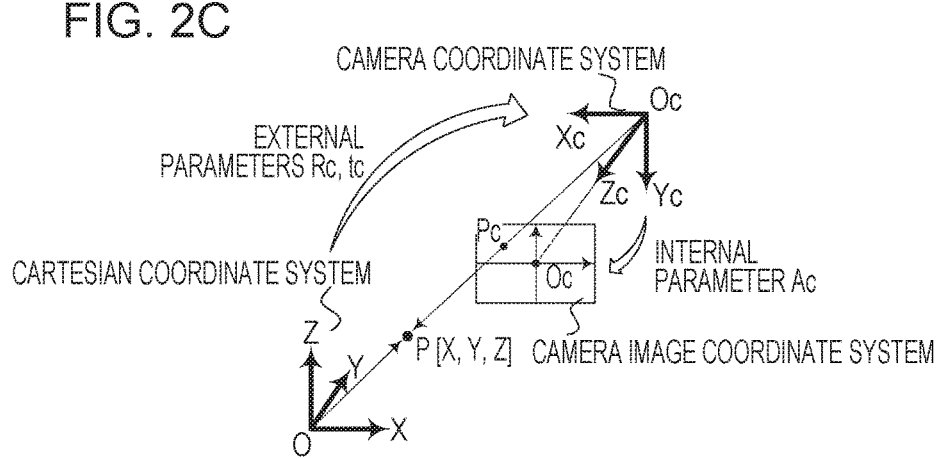

FIGS. 2A to 2C illustrate a configuration of the camera scanner 101 according to the first embodiment.

As illustrated in FIG. 2A, the camera scanner 101 includes a controller unit 201, a camera unit 202, an arm 203, a projector 207, and a sensor unit 208. The controller unit 201 being a main body of the camera scanner and the camera unit 202, projector 207 and sensor unit 208 configured for image capturing are connected through the arm 203. The arm 203 can be bent and extended through a joint.

FIG. 2A further illustrates an operating surface 204 above which the camera scanner 101 is placed. Lenses in the camera unit 202 and sensor unit 208 are directed toward the operating surface 204, and the camera unit 202 is capable of reading an image within a scan region 205 enclosed by a broken line. In the example in FIG. 2A, a document 206 is placed within the scan region 205 so that it can be scanned by the camera scanner 101.

Here, the camera unit 202 may capture images with a single resolution but may be capable of capturing images with a high-resolution and a low-resolution. A turntable 209 may be provided within the operating surface 204. The turntable 209 is capable of rotating in response to an instruction from the controller unit 201, and the angles of an object placed on the turntable 209 and the camera unit 202 are changeable. A touch panel sensor 330 may further be provided within the operating surface 204. The touch panel sensor 330 may detect information regarding a position where pressure is received as a result of a touch of a user's hand or a stylus pen, for example, and output it as coordinate information to the controller unit 201. The touch panel sensor 330 is a device capable of detecting a touch by a user and a touched position thereof and does not have a display function. The camera scanner 101 may further include a speaker 340 (FIG. 3), not illustrated in FIGS. 2A to 2C. Various sensor devices may further be included such as a human presence sensor, an illuminance sensor, and an acceleration sensor for collecting surrounding environment information.

FIG. 2B illustrates coordinate systems in the camera scanner 101. In the camera scanner 101, coordinate systems for hardware devices such as a coordinate system of a camera, a coordinate system of a sensor, and a coordinate system of a projector are defined. They are defined by assuming that an image plane to be captured by the camera unit 202 and sensor unit 208 or an image plane to be projected by the projector 207 is an XY-plane and the direction orthogonal to the image plane is a Z-direction. For uniformly handling three-dimensional data in those independent coordinate systems, a Cartesian coordinate system is defined which has an XY-plane being a plane including the operating surface 204 and a Z-axis being a direction upwardly orthogonal to the XY-plane.

As an example of a case where a coordinate system is to be converted, FIG. 2C illustrates a relationship among a Cartesian coordinate system, a space represented by using a camera coordinate system about the camera unit 202, and an image plane captured by the camera unit 202. A three-dimensional point P[X,Y,Z] in the Cartesian coordinate system can be converted to a three-dimensional point Pc[Xc, Yc,Zc] in the coordinate system about the camera by using Expression (1).

$$[Xc,Yc,Zc]T=[Rc|tc][X,Y,Z,1]T \quad (1)$$

Here Rc and tc are external parameters acquired from the attitude (rotation) and position (translation) of the camera unit 202 with respect to the Cartesian coordinate system, and Rc is called a 3×3 rotation matrix, and tc is called a translation vector. On the other hand, a three-dimensional point defined in the coordinate system about the camera can be converted to a Cartesian coordinate system by using Expression (2).

$$[X,Y,Z]T=[Rc-1|-Rc-1tc][Xc,Yc,Zc,1]T \quad (2)$$

A two-dimensional camera image plane captured by the camera unit 202 is a result of conversion of three-dimensional information in a three-dimensional space to two-dimensional information by the camera unit 202. In other words, perspective projection conversion can be performed on a three-dimensional point Pc [Xc,Yc,Zc] on the camera coordinate system to a three dimensional coordinates pc[xp, yp] on the camera image plane by using Expression (3).

$$\lambda[xp,yp,1]T=A[Xc,Yc,Zc]T \quad (3)$$

where A is called an internal parameter of the camera unit 202 and is a 3×3 matrix expressed by a focal point distance and an image center.

By using Expressions (1) and (3), a three-dimensional point set expressed by a Cartesian coordinate system can be converted to three-dimensional point set coordinates or a camera image plane in a camera coordinate system. It is assumed here that an internal parameter of each hardware device and a position attitude (external parameter) with respect to a Cartesian coordinate system are calibrated in advance by a publicly known calibration scheme. The term "three-dimensional point set" refers to three-dimensional data in a Cartesian coordinate system unless otherwise specified.

Figure 3:
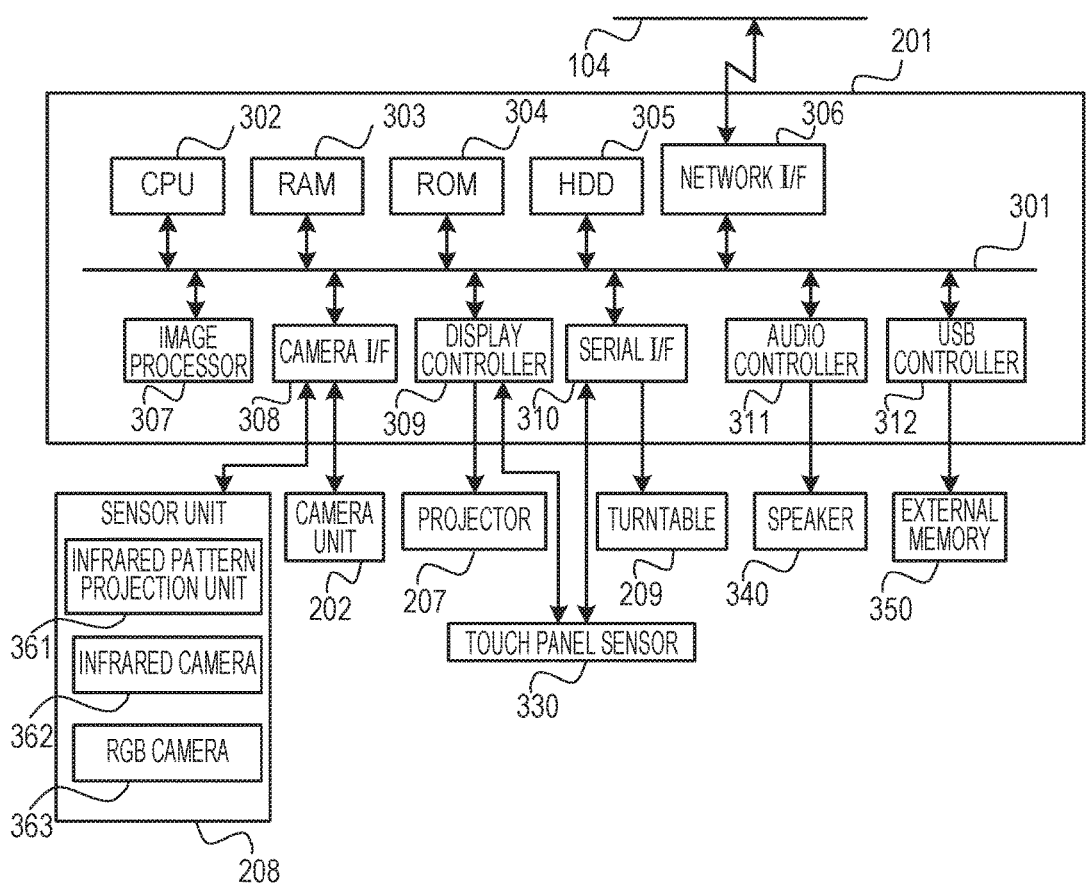
FIG. 3 illustrates a hardware configuration example of a controller unit in the camera scanner according to the first embodiment.

FIG. 3 illustrates a hardware configuration example of the controller unit 201 in the camera scanner 101 according to the first embodiment.

The controller unit 201 includes a CPU 302, a RAM 303, a ROM 304, an HDD 305, a network I/F 306, an image processor 307, a camera I/F 308, a display controller 309, and a serial I/F 310. The controller unit 201 further includes an audio controller 311 and a USB controller 312 which are connected to each other via a system bus 301. The CPU 302 is a central processing unit configured to generally control operations of the controller unit 201. The RAM 303 is a volatile memory. The ROM 304 is a nonvolatile memory and is configured to store a boot program for the CPU 302. The HDD 305 is a hard disk drive having a capacity larger than that of the RAM 303, and the HDD 305 may store a control program and an operating system (OS) to be executed by the controller unit 201 for the camera scanner 101. The CPU 302 may execute the boot program stored in the ROM 304 upon startup or when powered on and decompress the control program stored in the HDD 305 to the RAM 303. The CPU 302 executes the control program decompressed to the RAM 303 for execution of control processing by the controller unit 201. The CPU 302 also stores data to be used for operations by the control program in the RAM 303 and read and write them therefrom and thereto. The HDD 305 may further store settings necessary for operations to be performed by the control program and image data input from the camera unit 202, and the stored settings and image data can be read and written by the CPU 302. The CPU 302 communicates with other apparatuses over the network 104 via the network I/F 306.

The image processor 307 reads and processes image data stored in the RAM 303 and returns them to the RAM 303. The image processing to be executed by the image processor 307 may include rotation, scaling, and color conversion. The camera I/F 308 is connected to the camera unit 202 and the sensor unit 208 and, in response to an instruction from the CPU 302, acquires image data from the camera unit 202 and distance image data from the sensor unit 208 and writes them to the RAM 303. The camera I/F 308 sends a control command from the CPU 302 to the camera unit 202 and the sensor unit 208 and defines settings for the camera unit 202 and the sensor unit 208.

The controller unit 201 may further include at least one of the display controller 309, the serial I/F 310, the audio controller 311 and the USB controller 312. The display controller 309 is configured to control display of image data on a display unit in response to an instruction from the CPU 302. Here, the display controller 309 is connected to the short focus projector 207.

The serial I/F 310 is configured to input/output serial signals. In this case, the serial I/F 310 is connected to the turntable 209 and may transmit instructions to start and finish a rotation and a rotation angle from the CPU 302 to the turntable 209. The serial I/F 310 is connected to the touch panel sensor 330. When the touch panel sensor 330 is pressed, the CPU 302 acquires coordinate information regarding a corresponding pressed position through the serial I/F 310. The CPU 302 determines whether the touch panel sensor 330 is connected thereto or not through the serial I/F 310. The audio controller 311 is connected to the speaker 340 and is configured to convert audio data to an analog audio signal in response to an instruction from the CPU 302 and output audio through the speaker 340. The USB controller 312 is configured to control an externally attached USB device in response to an instruction from the CPU 302. In this case, the USB controller 312 is connected to an external memory 350 such as a USB memory or an SD card, and the CPU 302 reads and writes data from and to the external memory 350 through the USB controller 312. The sensor unit 208 includes an infrared pattern projection unit 361, an infrared camera 362, and an RGB camera (visible light camera) 363, which will be described below with reference to FIG. 5 and FIGS. 6A to 6C. The turntable 209 may be used for acquiring distance image data, which will be described below, but may be removed from the operating surface 204 in a case where images are projected on the operating surface 204 by the projector 207 and a user designates an image by using his/her finger.

Figure 4:
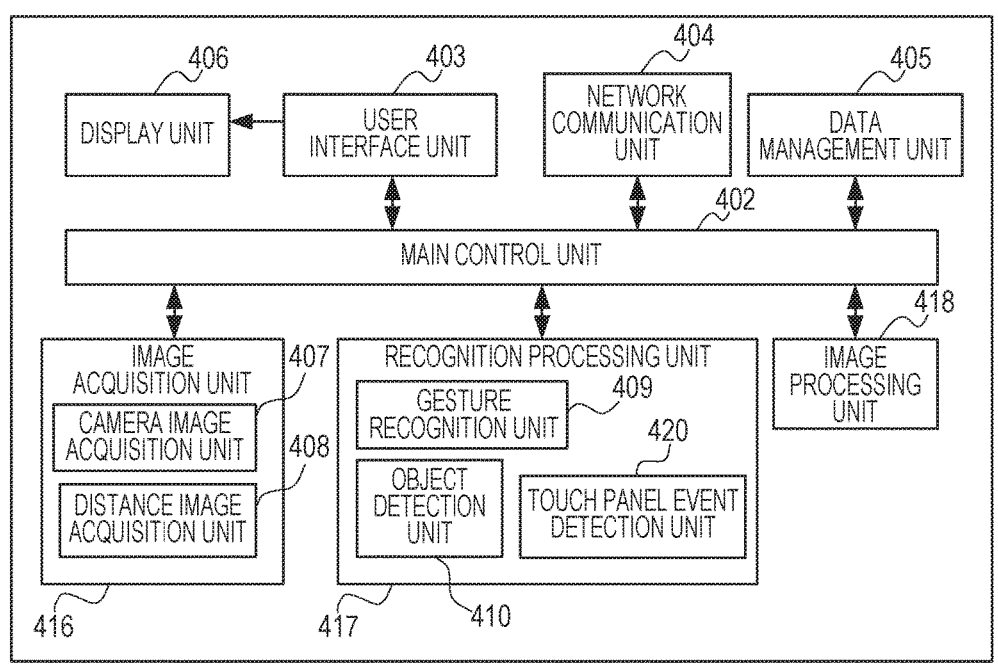
FIG. 4 is a functional block diagram illustrating functions in the controller unit of the camera scanner according to the first embodiment.

FIG. 4 is a functional block diagram illustrating functions of the controller unit 201 in the camera scanner 101 according to the first embodiment. These functions may be implemented by execution of programs decompressed by the CPU 302 from the HDD 305 to the RAM 303.

A main control unit 402 is configured to control modules implementing those functions. An image acquisition unit 416 is a module configured to perform processing for input image data and has a camera image acquisition unit 407, and a distance image acquisition unit 408. The camera image acquisition unit 407 is configured to acquire image data output from the camera unit 202 and store them to the RAM 303 through the camera I/F 308. The distance image acquisition unit 408 is configured to acquire distance image data output from the sensor unit 208 and store them in the RAM 303 through the camera I/F 308. The processing to be performed by the distance image acquisition unit 408 will be described in detail with reference to FIG. 5 and FIGS. 6A to 6C.

The recognition processing unit 417 is a module configured to detect and recognize a motion of an object on the operating surface 204 from image data acquired by the camera image acquisition unit 407 and the distance image acquisition unit 408. The recognition processing unit 417 includes a gesture recognition unit 409, an object detection unit 410, and a touch panel event detection unit 420. The gesture recognition unit 409 is configured to acquire images on the operating surface 204 output from the image acquisition unit 416 and notify the main control unit 402 of a gesture such as a touch of a user's finger if detected. The processing to be performed by the gesture recognition unit 409 will be described in detail with reference to FIG. 7 and FIGS. 8A to 8C. The object detection unit 410 is configured to acquire image data acquired by capturing an image of the operating surface 204 from the image acquisition unit 416 and detect a time point when an object is placed on the operating surface 204, a time point when the object stays still after it is placed, and a time point when the object is removed. The touch panel event detection unit 420 is configured to receive coordinate information regarding a position touched by a user's finger on the touch panel sensor 330 and notify the main control unit 402 of the coordinate information as a touch panel event through the serial I/F 310.

The image processing unit 418 is usable for analyzing image data acquired from the camera unit 202 and sensor unit 208 by using the image processor 307 and has image processing modules. The gesture recognition unit 409 and the object detection unit 410 are implemented by using the image processing modules in the image processing unit 418.

A user interface unit 403 in response to a request from the main control unit 402 generates a GUI part such as a message and a button and requests a display unit 406 to display the generated GUI part. The display unit 406 is configured to display the requested GUI part by using the projector 207 through the display controller 309. The projector 207 is installed toward the operating surface 204 so that a GUI part can be projected to the operating surface 204. The user interface unit 403 is configured to receive a gesture operation such as a touch recognized by the gesture recognition unit 409, a touch operation detected by the touch panel event detection unit 420, and coordinate information of the touched position through the main control unit 402. The user interface unit 403 determines an operation content (such as a pressed button) in association with details of an operating screen being rendered and coordinate information regarding the operation. The user interface unit 403 notifies the operation content to the main control unit 402 to receive an operation performed by the operator.

A network communication unit 404 is configured to communicate based on TCP/IP with other apparatuses over the network 104 through the network I/F 306. A data management unit 405 is configured to store various data job data, for example, generated by execution of the control program 401 to a predetermined region on the HDD 305 and manage them.

Next, with reference to FIG. 5 and FIGS. 6A to 6C, processing and functions of the distance image acquisition unit 408 in the sensor unit 208 will be described. The sensor unit 208 is an infrared pattern projection image sensor. An infrared pattern projection unit 361 is configured to project a three-dimensional measurement pattern by using an infrared ray visible to human eyes to a target. The infrared camera 362 reads a three-dimensional measurement pattern projected to the target. An RGB camera 363 captures light visible to human eyes with an RGB signal.

Next, processing to be performed by the distance image acquisition unit 408 will be described with reference to the flowchart in FIG. 5. FIGS. 6A to 6C illustrate a measurement principle for a distance image based on pattern projection.

Figure 5:
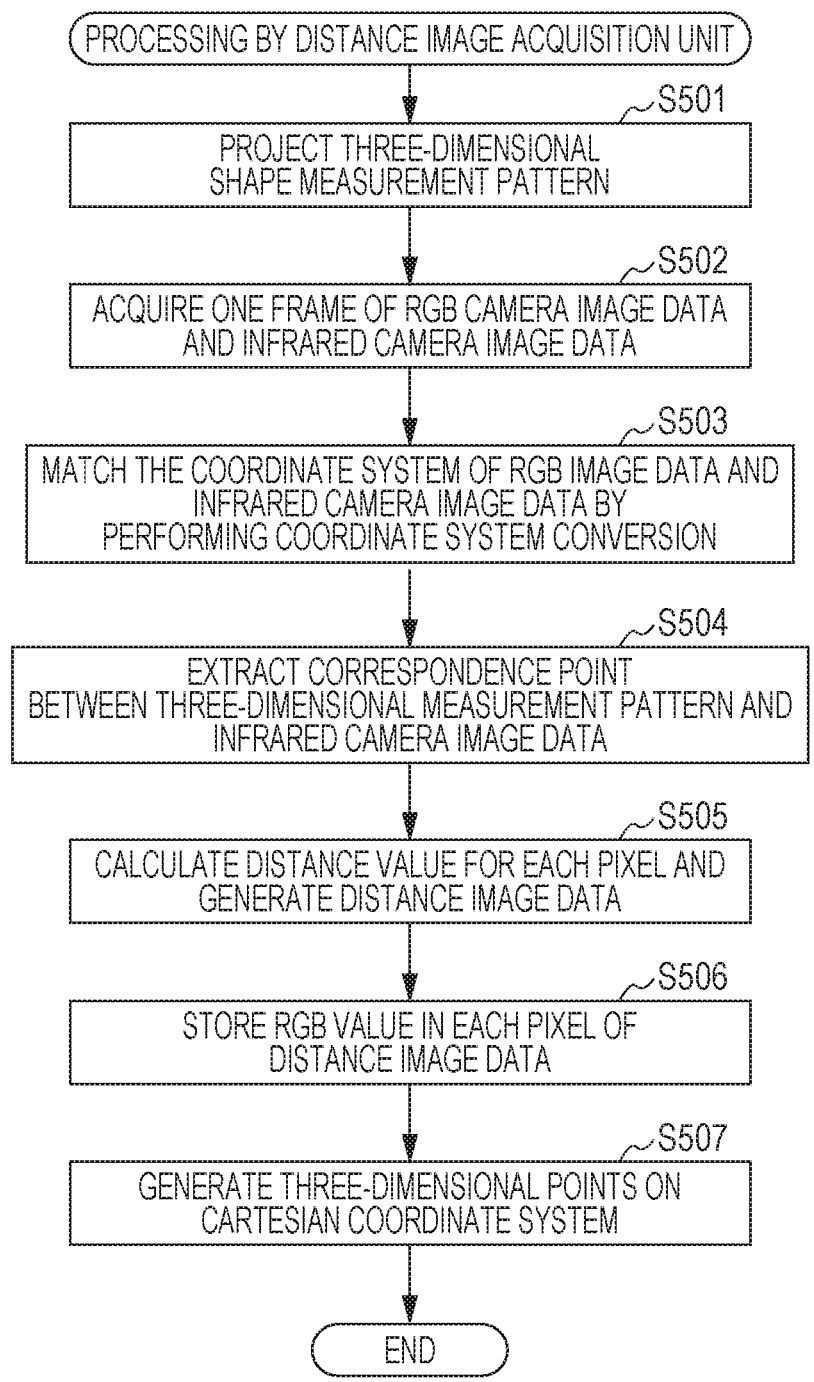
FIG. 5 is a flowchart illustrating processing in a distance image acquisition unit according to the first embodiment.
Figure 6A:
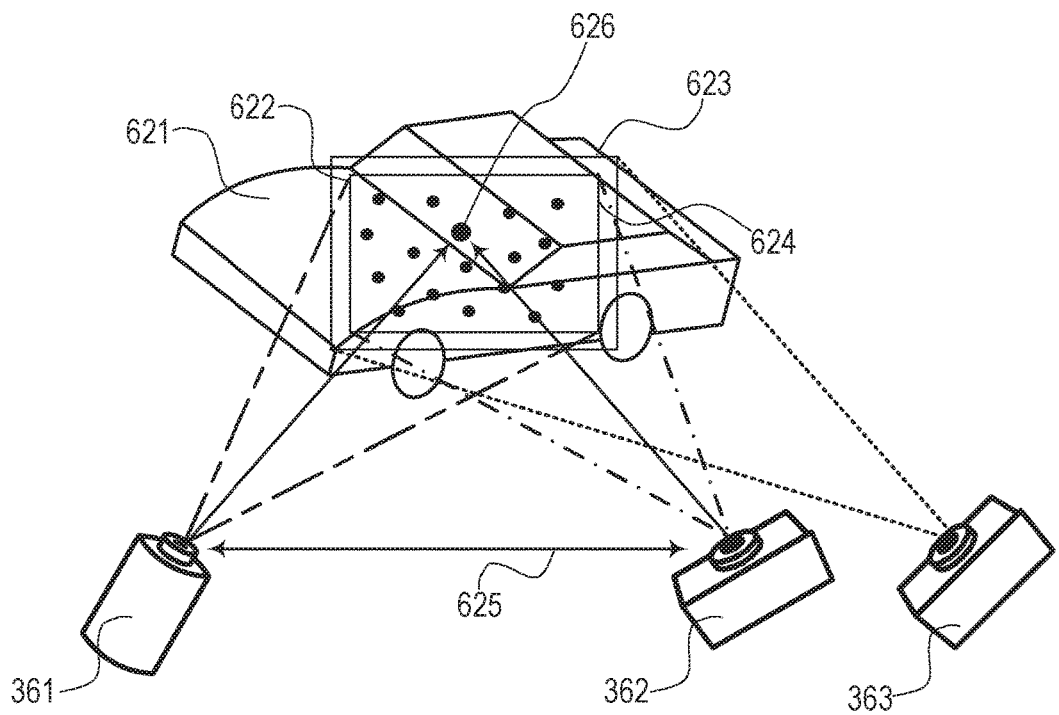
FIGS. 6A to 6C illustrate a measurement principle applicable to a distance image based on a pattern projection method.
Figure 6B:
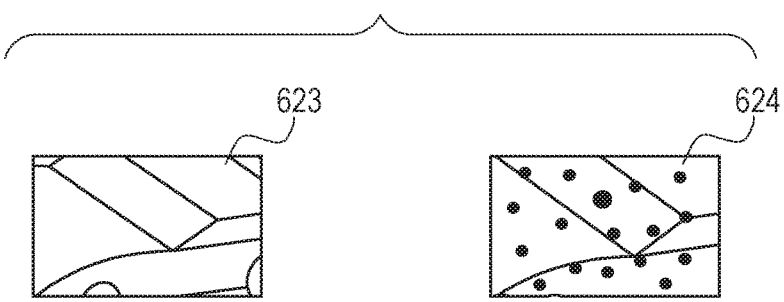
Figure 6C:
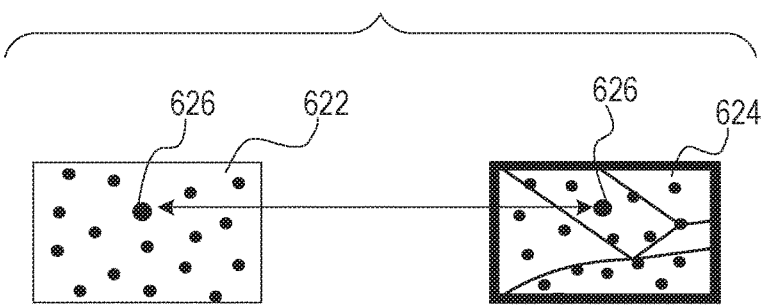

FIG. 5 is a flowchart illustrating processing to be performed by the distance image acquisition unit 408 according to the first embodiment. The processing may be implemented by the CPU 302 functioning as the distance image acquisition unit 408, and a program executing the processing is stored in the HDD 305. The CPU 302 decompresses the program to the RAM 304 and executes it. Therefore, the following descriptions assume that the subject of the processing in steps is the CPU 302.

First, in S501, the CPU 302 uses the infrared pattern projection unit 361 to project a three-dimensional shape measurement pattern 622 to the target 621 by using an infrared ray, as illustrated in FIG. 6A. Next, in S502, the CPU 302 acquires RGB image data 623 acquired by capturing a target by using the RGB camera 363 and infrared camera image data 624 (FIG. 6B) acquired by capturing the three-dimensional measurement pattern 622 projected in S501 by using the infrared camera 362. Because the infrared camera 362 and the RGB camera 363 are placed at different locations, different regions are captured in the RGB camera image data 623 and infrared camera image data 624 by them, as illustrated in FIG. 6B. Accordingly, in S503, the CPU 302 performs coordinate system conversion from a coordinate system of the infrared camera 362 to a coordinate system of the RGB camera 363 to match the infrared camera image data 624 with the coordinate system of the RGB camera image data 623. It is assumed here that the relative positions and internal parameters of the infrared camera 362 and the RGB camera 363 are known from calibration processing performed in advance.

Next, in S504, the CPU 302 extracts a correspondence point 626 between the three-dimensional measurement pattern 622 and infrared camera image data 624 having undergone the coordinate conversion in S503, as illustrated in FIG. 6C. For example, one point on the infrared camera image data 624 may be searched from the three-dimensional shape measurement pattern 622 and, if detected, the one point may be associated with the detected one. Alternatively, a surrounding pattern of a pixel in the infrared camera image data 624 may be searched from the three-dimensional shape measurement pattern 622, and the surrounding part may be associated with the part having a highest similarity level. Next, in S505, the CPU 302 calculates a straight line connecting the infrared pattern projection unit 361 and the infrared camera 362 as a base line 625 by using a radio triangulation principle to calculate the distance from the infrared camera 362 to the correspondence point 626. The CPU 320 then stores a distance from the infrared camera 362 to each of the associated pixels as a pixel value and stores an invalid value indicating that the distance measurement is disabled for the pixels that are not associated. This processing may be performed on all pixels of the infrared camera image data 624 having undergone the coordinate conversion in S503 to generate distance image data describing pixels and their distances. In S506, the CPU 302 stores an RGB value of the RGB camera image data 623 in each pixel of the distance image data to generate distance image data having four values of R, G, B, and distance for one pixel. The distance image data generated here are referred by the sensor coordinate system defined by the RGB camera 363 in the sensor unit 208. Accordingly, in S507, the CPU 302 converts the distance image data acquired as a sensor coordinate system as described above with reference to FIG. 2B to a three-dimensional point set in the Cartesian coordinate system of the operating surface 204. Then, the processing ends. The term "three-dimensional point set" refers to a three-dimensional point set in a Cartesian coordinate system unless otherwise specified.

According to the first embodiment, as described above, the sensor unit 208 applies infrared pattern projection, but a distance image sensor applying another method may be used. For example, other measurement methods may be used such as a stereo method based on a stereoscopic approach with two RGB cameras and a TOF (Time of Flight) which measures a distance by detecting a time of flight of a laser beam.

Figure 7:
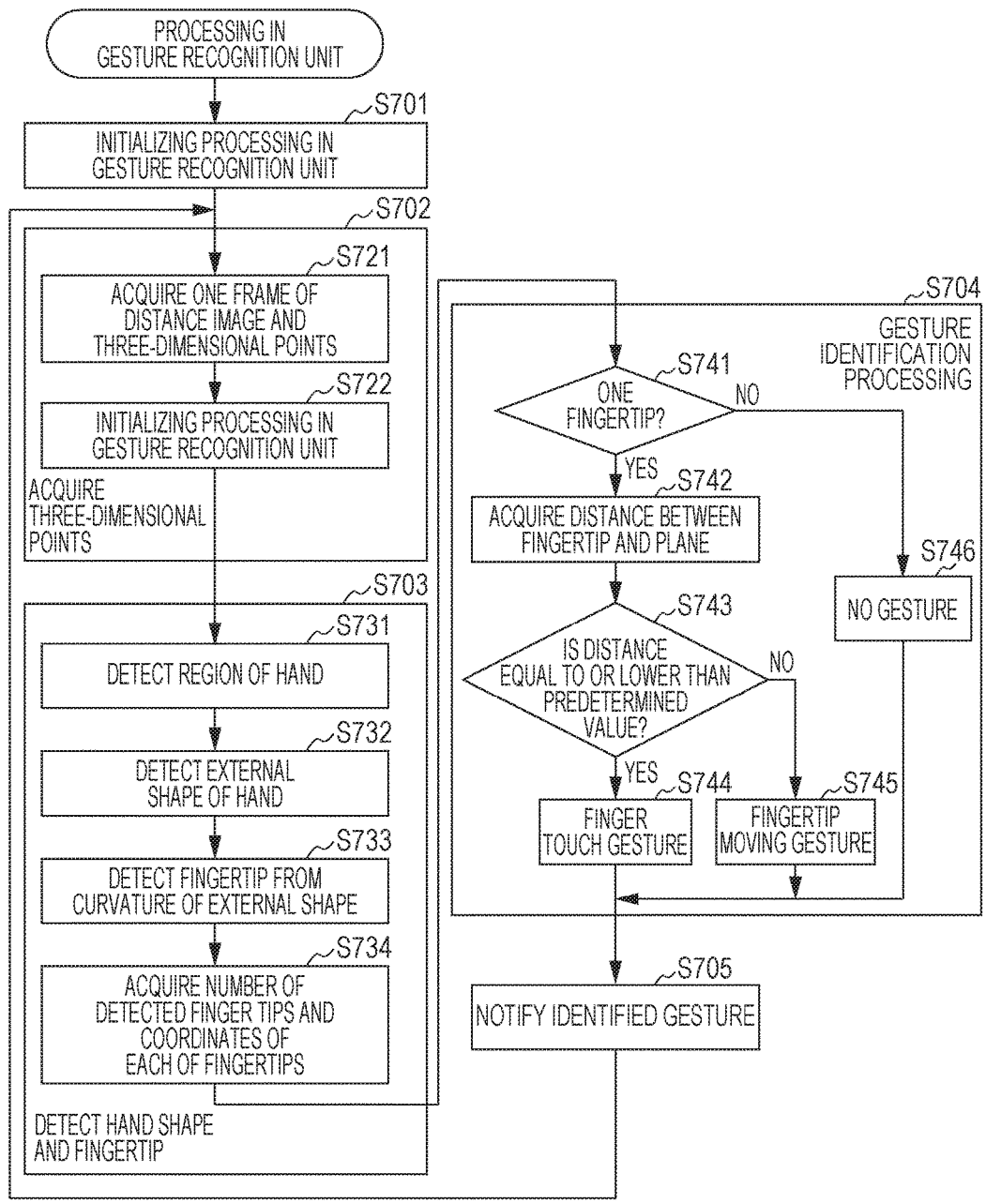
FIG. 7 is a flowchart illustrating processing in a gesture recognition unit according to the first embodiment.

FIG. 7 is a flowchart illustrating processing to be performed by the gesture recognition unit 409 according to the first embodiment. This processing is implemented by the CPU 302 functioning as the gesture recognition unit 409, and a program executing this processing is stored in the HDD 305, and the CPU 302 decompresses the program to the RAM 304 and executes it for the implementation. The following description assumes that the subject of the processing in steps is the CPU 302.

First, in S701, the CPU 302 performs an initialization process for gesture recognition processing. In the initialization process, the CPU 302 acquires distance image data of one frame from the distance image acquisition unit 408. Upon start of this processing, no target is placed on the operating surface 204. Thus, a plane of the operating surface 204 is recognized as its initial state. In other words, the widest plane is extracted from the acquired distance image data, and the position and normal vector thereof (hereinafter, called plane parameter of the operating surface 204) are calculated and are stored in the RAM 303. Next, in S721 and S722 in S702, the CPU 302 acquires a three-dimensional point set of an object present on the operating surface 204. In this case, in S721, distance image data and a three-dimensional point set of one frame are acquired from the distance image acquisition unit 408. Next, in S722, the CPU 302 uses the plane parameter of the operating surface 204 to remove a point set present in the plane including the operating surface 204 from the acquired three-dimensional point set.

Next, in S731 to S734 in S703, the CPU 302 performs processing for detecting a shape of a hand and a fingertip of an operator from the acquired three-dimensional point set. A method for the fingertip detection processing will be described with reference to FIGS. 8A to 8C which illustrate the method schematically.

Figure 8A:
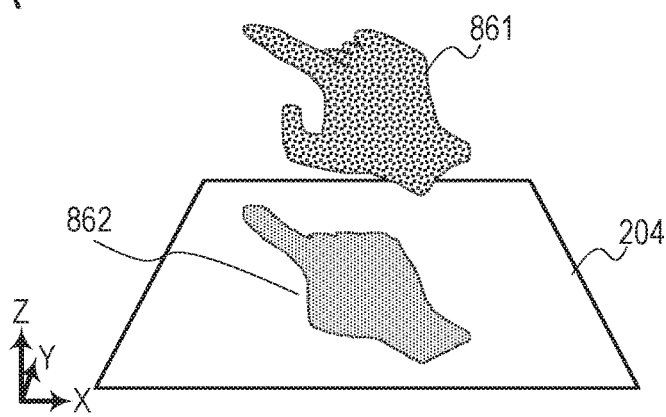
FIGS. 8A to 8C schematically illustrate a method for fingertip detection processing according to the first embodiment.
Figure 8B:
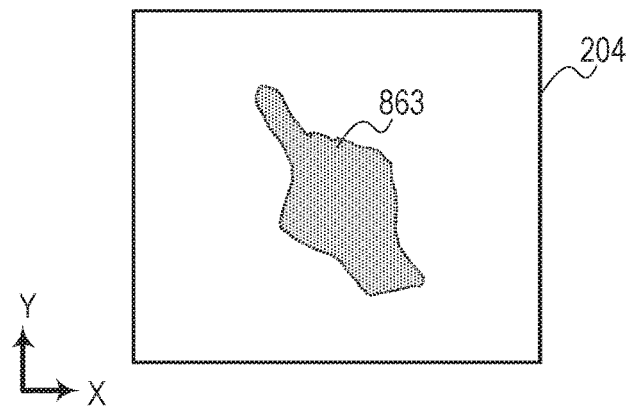

First, in S731, the CPU 302 extracts a three-dimensional point set in skin color at a predetermined height or higher from the plane including the operating surface 204 from the three-dimensional point set acquired in S702 to acquire the three-dimensional point set of the hand. FIG. 8A illustrates a three-dimensional point set 861 which is an example of the acquired three-dimensional point set of the hand. Next, in S732, the CPU 302 generates two-dimensional image data acquired by projecting the extracted three-dimensional point set of the hand to the plane of the operating surface 204 and detects an external form of the hand. FIG. 8A illustrates a three-dimensional point set 862 projected to the operating surface 204. The projection may project coordinates of the point set by using the plane parameter of the operating surface 204. As illustrated in FIG. 8B, xy-coordinate values may be extracted from the projected three-dimensional point set so that they can be handled as a two-dimensional image 863 viewed from the Z axis direction. In this case, the correspondences between the points of the three-dimensional point set of the hand and the coordinates of the two-dimensional image 863 projected to the operating surface 204 are stored. Next, in S733, the CPU 302 calculates a curvature at each point of an external form of the detected hand and detects a point having the calculated curvature lower than a predetermined value as a fingertip.

Figure 8C:
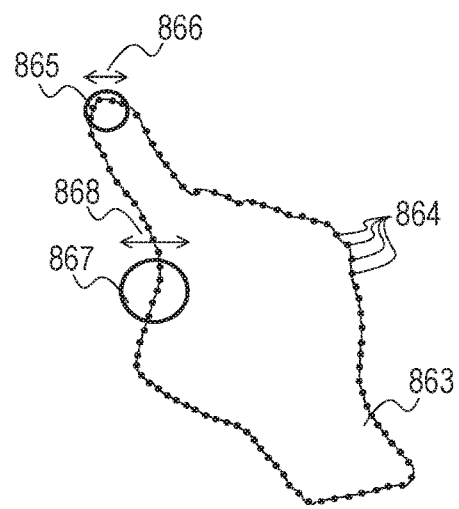

FIG. 8C schematically illustrates a method for detecting a fingertip based on a curvature of an external form of a hand. FIG. 8C illustrates a part 864 of the points representing the external form of the two-dimensional image 863 projected to the operating surface 204. Here, a circle may be rendered such that the circle can include five adjacent points of the part 864 representing the external form. FIG. 8C illustrates example circles 865 and 867 thereof. Such circles are drawn in order with respect to all of points of the external form, and a circle having a diameter (such as diameters 866 and 868) smaller than a predetermined value (with a smaller curvature) is determined as a fingertip. Having described the example in which adjacent five points are applied, the number is not limited to five. Though curvatures are used here, ellipse fitting may be performed on an external form to detect a fingertip. In S734, the CPU 302 calculates the number of detected fingertips and coordinates of the fingertips. In this case, because the correspondence relationship between points of the two-dimensional image projected to the operating surface 204 and points of the three-dimensional point set of the hand is stored as described above, the three-dimensional coordinates of the fingertips can be acquired.

Having described here the method for detecting a fingertip from image data projected to a two-dimensional image from a three-dimensional point set, the image data from which a fingertip is detected is not limited thereto. For example, a hand region may be extracted from background differences of distance images or a skin color region of RGB image data, and a fingertip may be detected from the hand region by the same method (calculating a curvature of an external form) as described above. In this case, the coordinates of the detected fingertip are coordinates on a two-dimensional image such as an RGB image data or a distance image. Therefore, they must be converted to the three-dimensional coordinates in a Cartesian coordinate system by using distance information of the distance image at the coordinate. In this case, instead of a point on an external form being a fingertip point, the center of a curvature circle used for detecting a fingertip may be used as the fingertip point.

Next, in S741 to S746 in S704, the CPU 302 performs gesture determination processing from the shape and fingertip from the detected hand. First, in S741, the CPU 302 determines whether the number of fingertips detected in S703 is equal to one or not. If it is determined here that the number of fingertips is not equal to one, the processing moves to S746. If it is determined in S746 that there is no gesture, the processing moves to S705. If it is determined in S741 that the number of detected fingertips is equal to one, the processing moves to S742 where the CPU 302 calculates the distance between the detected fingertip and a plane including the operating surface 204. Next, in S743, the CPU 302 determines whether the distance calculated in S742 is equal to or lower than a predetermined value. If so, the processing moves to S744 where the CPU 302 determines that there is a touch gesture in which the fingertip touches the operating surface 204. Then, the processing moves to S705. On the other hand, if it is determined in S743 that the distance calculated in S742 is not equal to or lower than the predetermined value, the processing moves to S745 where the CPU 302 determines there is a gesture in which the fingertip has moved (or a gesture in which the fingertip is present above the operating surface 204 without touching it). Then, the processing moves to S705. In S705, the CPU 302 notifies the determined gesture to the main control unit 402. The processing returns to S702, and the gesture recognition processing is repeated.

Having described that gesture recognition for one finger, an embodiment of the present invention is also applicable to gesture recognition for a plurality of fingers, a plurality of hands, a whole arm or a whole body.

Next, with reference to FIGS. 9A and 9B and FIG. 10, processing to be performed by the object detection unit 410 according to the first embodiment will be described.

Figure 9A:
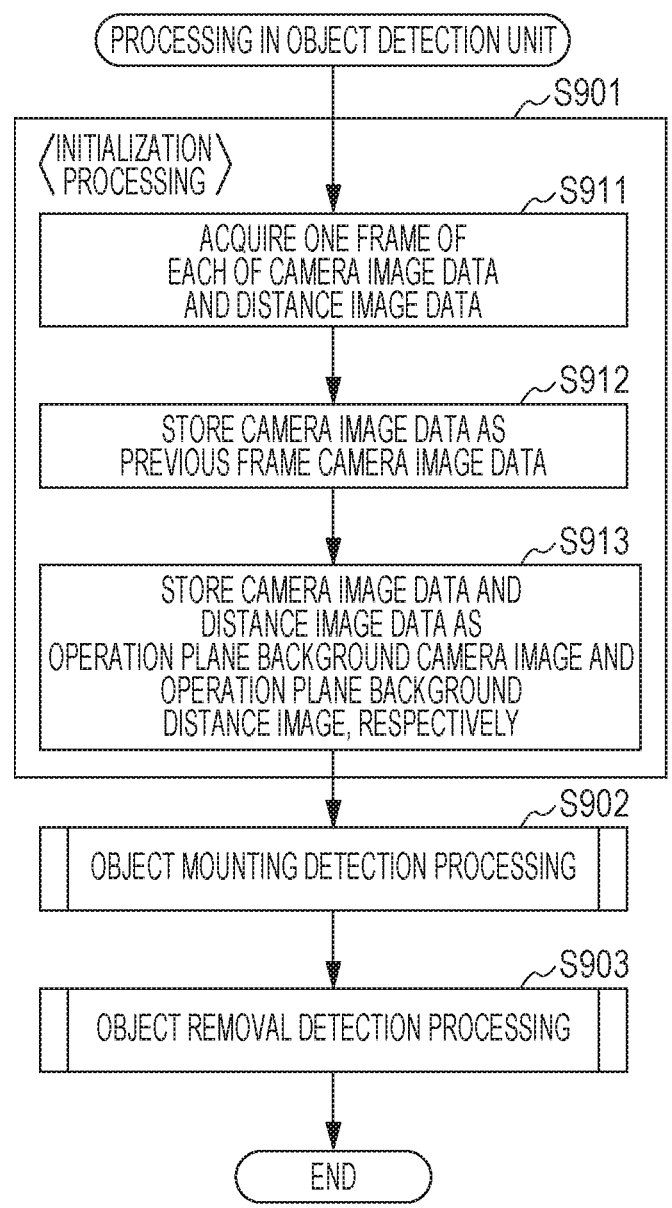

FIG. 9A is a flowchart illustrating processing to be performed by the object detection unit 410 according to the first embodiment. This processing may be implemented by the CPU 302 functioning as the object detection unit 410, and a program executing the processing is stored in the HDD 305, and the CPU 302 decompresses the program to the RAM 304 and executes it. Therefore, the following descriptions assume that the subject of the processing in steps is the CPU 302.

First, in S911 to S913 in S901, the CPU 302 performs an initialization process. First in S911, the CPU 302 acquires camera image data captured by the camera from the camera image acquisition unit 407 and distance image data from the distance image acquisition unit 408 for one frame. Next, in S912, the CPU 302 stores the camera image data acquired in S911 as camera image data of the previous frame. Next, in S913, the CPU 302 stores the camera image data and distance image data acquired in S911 as camera image data describing a background of the operating surface 204 and distance image data being a background of the operating surface 204. Hereinafter, the terms, "operating surface background camera image data" and "operating surface background distance image" refer to camera image data and distance image data being an initial image of the operating surface acquired here.

After the initialization process ends in this manner, the CPU 302 in S902 performs processing (object mount detection processing) for detecting whether an object is mounted on the operating surface 204. Details of the processing in S902 will be described below with reference to FIG. 9B. Next, in S903, the CPU 302 performs processing (object removal detection processing) for detecting whether the object detected as being placed on the operating surface 204 in S902 is removed or not. Details of the processing in S903 will be described below with reference to FIG. 10.

FIG. 9B is a flowchart illustrating the object mounting detection processing in S902 in FIG. 9A.

First in S921, the CPU 302 acquires camera image data for one frame from the camera image acquisition unit 407. Next in S922, the CPU 302 acquires a difference between the acquired camera image data and the operating surface background camera image data for each pixel and acquires a difference value by adding absolute values of the differences. In S923, the CPU 302 determines whether the difference value acquired in S922 is equal to or higher than a predetermined value or not. If the difference value is lower than the predetermined value, it is determined that no object is placed on the operating surface 204. The processing moves to S928 where the camera image data of the current frame is stored as camera image data of the previous frame, and the processing moves to S921.

On the other hand, if it is determined in S923 that the difference value is equal to or higher than the predetermined value, the processing moves to S924 where the CPU 302 calculates the difference value between the camera image data acquired in S921 and the camera image data of the previous frame in the same manner as in S922. In S925, the CPU 302 determines whether the difference value acquired in S924 is equal to or lower than a predetermined value or not. If it is determined in S925 that the difference value is higher than the predetermined value, the CPU 302 determines that the object is moving on the operating surface 204. Then, the processing moves to S928. In S928, the CPU 302 stores the camera image data of the current frame as camera image data of the previous frame. The processing then moves to S921.

On the other hand, if it is determined that the difference value acquired in S925 is equal to or lower than the predetermined value, the processing moves to S926. In S926, after the determination in S925 results in YES, the CPU 302 determines whether the difference value is equal to or lower than a predetermined value or not, that is, whether a predetermined plurality of serial frames having a state in which the object on the operating surface 204 stays still. If not in S926, the processing moves to S928. If so in S926, the processing moves to S927 where the CPU 302 notifies that the object has been placed on the operating surface 204 to the main control unit 402, and the processing ends.

Figure 10:
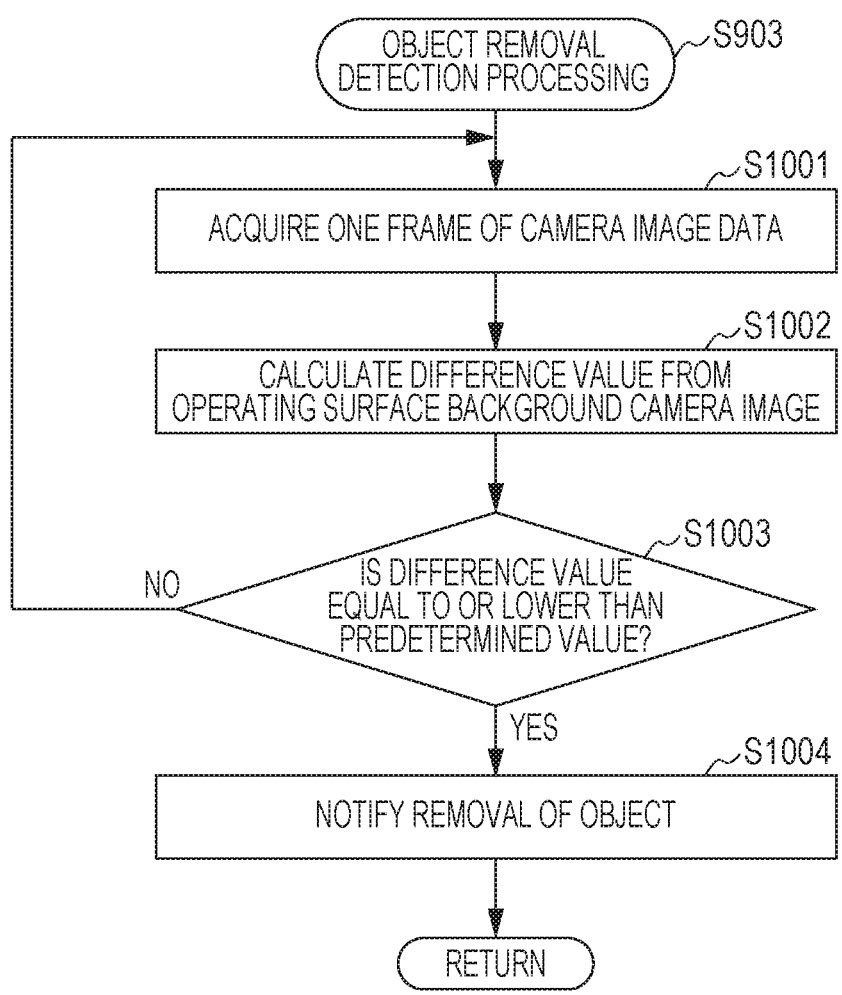
FIG. 10 is a flowchart illustrating object removal detection processing in S903 in FIG. 9A.

FIG. 10 is a flowchart illustrating the object removal detection processing in S903 in FIG. 9A.

First, in S1001, the CPU 302 acquires camera image data for one frame from the camera image acquisition unit 407. Next, in S1002, the CPU 302 calculates a difference value between the camera image data acquired in S1001 and the operating surface background camera image in the same manner as in S922. In S1003, the CPU 302 determines whether the calculated difference value is equal to or lower than a predetermined value or not. If it is determined in S1003 that the calculated difference value is higher than the predetermined value, the CPU 302 determines that the object is still present on the operating surface 204. The processing then returns to S1001 and continues. If it is determined in S1003 that the difference value is equal to or lower than the predetermined value, the CPU 302 determines that the object is no longer present on the operating surface 204. The processing then moves to S1004 where the CPU 302 notifies that the object on the operating surface 204 has been removed to the main control unit 402. Then, the processing ends.

Through the processing as described above, it can be detected that an object is placed on the operating surface 204 and that the object is removed from the operating surface 204.

Next, with reference to the flowchart in FIG. 11, control processing to be performed by the main control unit 402 according to the first embodiment will be described.

Figure 11:
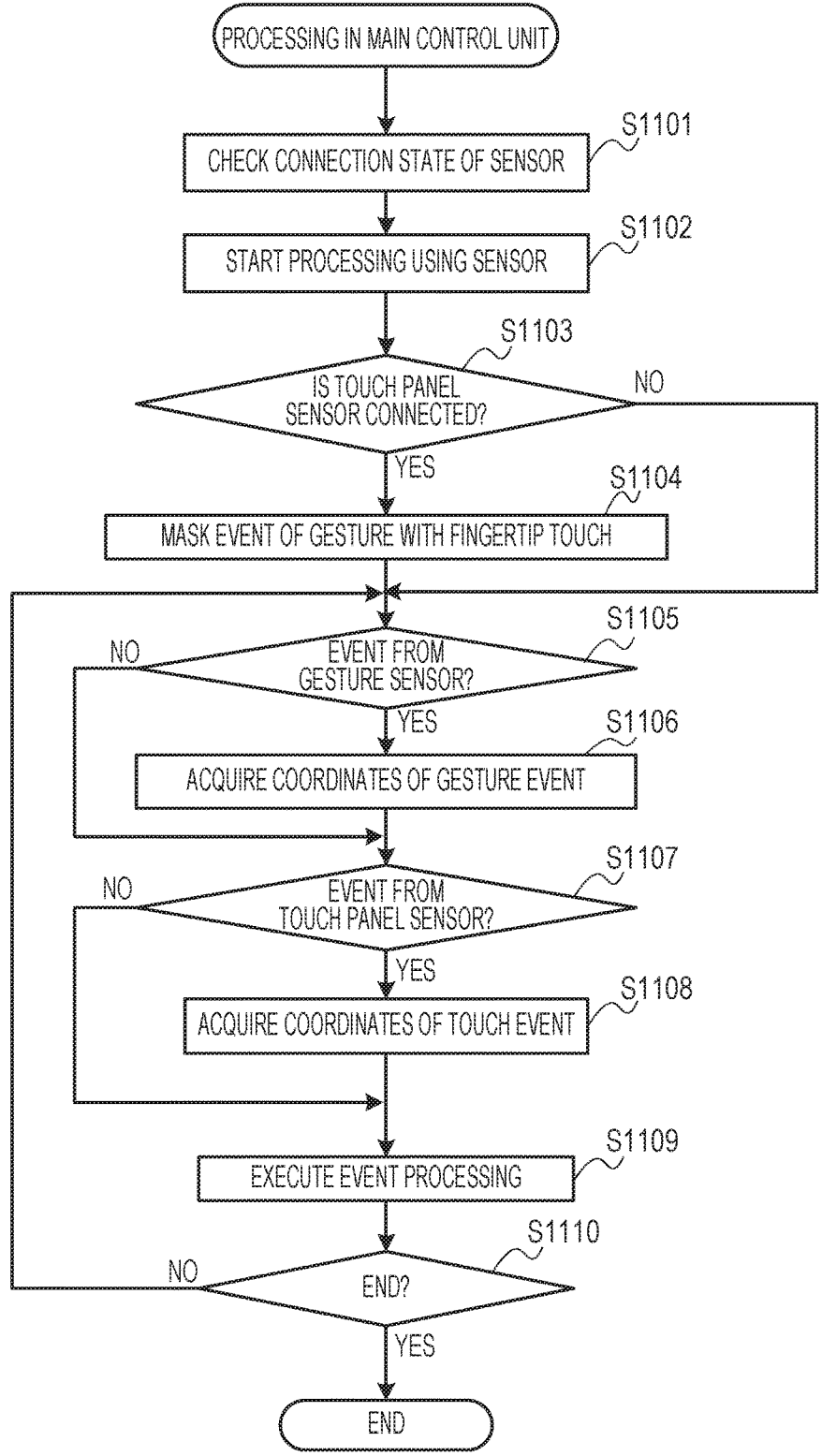
FIG. 11 is a flowchart illustrating processing to be performed by a main control unit according to the first embodiment.

FIG. 11 is a flowchart illustrating processing to be performed by the main control unit 402 according to the first embodiment. The processing may be implemented by the CPU 302 functioning as the main control unit 402, and a program executing the processing is stored in the HDD 305. The CPU 302 decompresses the program to the RAM 304 and executes it. Therefore, the following descriptions assume that the subject of the processing in steps is the CPU 302.

In S1101, the CPU 302 checks sensor connection states. In this case, connection states with sensors connected to the controller unit 201 are detected. According to the first embodiment, for example, whether the distance image sensor unit 208, the camera unit 202, and the touch panel sensor 303 are connected thereto or not is checked. Next, in S1102, the CPU 302 starts processing using the sensor the connection of which is checked and confirmed in S1101. According to the first embodiment, among them, the distance image sensor unit 208 relating to the gesture recognition and processing relating to the touch panel sensor 330 will be described. According to the first embodiment, which information is to be selected to recognize a gesture when information for performing a gesture recognition is output from the distance image sensor unit 208 and the touch panel sensor 330 will be described in detail.

In S1103, the CPU 302 determines whether the touch panel sensor 330 is connected or not on the basis of the check result regarding the connection states of the sensors in S1101. If the CPU 302 determines that the touch panel sensor 330 is not connected, the processing moves to S1105. On the other hand, if it is determined in S1103 that the touch panel sensor 330 is connected, the processing moves to S1104 where mask processing is performed which masks an event caused by a gesture with a fingertip touch from the distance image sensor unit 208 described with reference to FIG. 7 and FIGS. 8A to 8C. This means that, when the touch panel sensor 330 is connected, information from the touch panel sensor 330 is selected as a touch event instead of a gesture event caused by a fingertip touch from the distance image sensor unit 208. Even when the touch panel sensor 330 is connected, a gesture event caused by a movement of a fingertip detected by the distance image sensor unit 208, which has been described with reference to FIG. 7 and FIGS. 8A to 8C can be acquired as a gesture sensor event.

Next, in S1105, the CPU 302 determines whether there is an event detected by the gesture sensor (distance image sensor unit 208) or not. If there is no event detected by the gesture sensor, the processing moves to S1107. On the other hand, if there is an event detected by the gesture sensor, the processing moves to S1106 where the CPU 302 acquires coordinates at a time point when the event is occurring and notifies the coordinates along with the type of the event. The processing then moves to S1107. Here, if the touch panel sensor 330 is not connected, the gesture event in S1106 is not selected.

Next, in S1107, the CPU 302 determines whether any event from the touch panel sensor 330 is occurring or not. An event from the touch panel sensor 330 is caused by application of pressure to the touch panel sensor 303 with a hand or a stylus pen by a user as described above. If it is determined in S1107 that there is no touch event from the touch panel sensor 303, the processing moves to S1109. If a touch event occurs in the touch panel sensor 303, the processing moves to S1108. In S1108, the CPU 302 notifies the time and coordinates at the time point. The processing then moves to S1109. In S1109, the CPU 302 executes event processing on the basis of an event from the gesture sensor detected in the processing up to this point and the touch event from the touch panel sensor 330. The processing then moves to S1110. The processing to be performed on an event may be processing for changing a display image on the basis of a user's touch operation and depends on an application. Therefore, detail descriptions thereon will be omitted.

If the touch panel sensor 330 is connected, a gesture event caused by a fingertip touch is not selected in S1109 from gesture events detected in S1106. In S1110, the CPU 302 determines whether the processing as the main control unit 402 is to be ended or not. If not, the processing returns to S1105, and the processing is repeated. If the processing as the main control unit 402 ends, the processing ends.

According to the first embodiment as described above, whether the touch panel sensor 330 is connected or not is determined. If the touch panel sensor 330 is connected, information from the touch panel sensor 330 is used to recognize an operation performed by a user. Thus, even when a plurality of sensors capable of recognizing a gesture is connected, the gesture recognition processing can be performed simply and quickly. When a touch panel sensor capable of detecting coordinates with high precision is connected, the coordinate detection by the touch panel sensor may be selected for coordinate detection with higher precision.

Second Embodiment

According to the first embodiment, when the touch panel sensor 330 is connected, a gesture event which is caused by detection of a fingertip touch by the distance image sensor unit 208 is masked. According to the second embodiment on the other hand, when an object is placed on the operating surface 204, coordinate detection by the touch panel sensor is disabled in a region of the object. Accordingly, an example will be described in which coordinates designated in an region where an object is placed are detected by a gesture sensor unit, and coordinate detection is performed by the touch panel sensor in the other region. Because the configuration of the camera scanner 101 according to the second embodiment and the system configuration of the camera scanner 101 are the same as those of the first embodiment, any repetitive description will be omitted.

Figure 12:
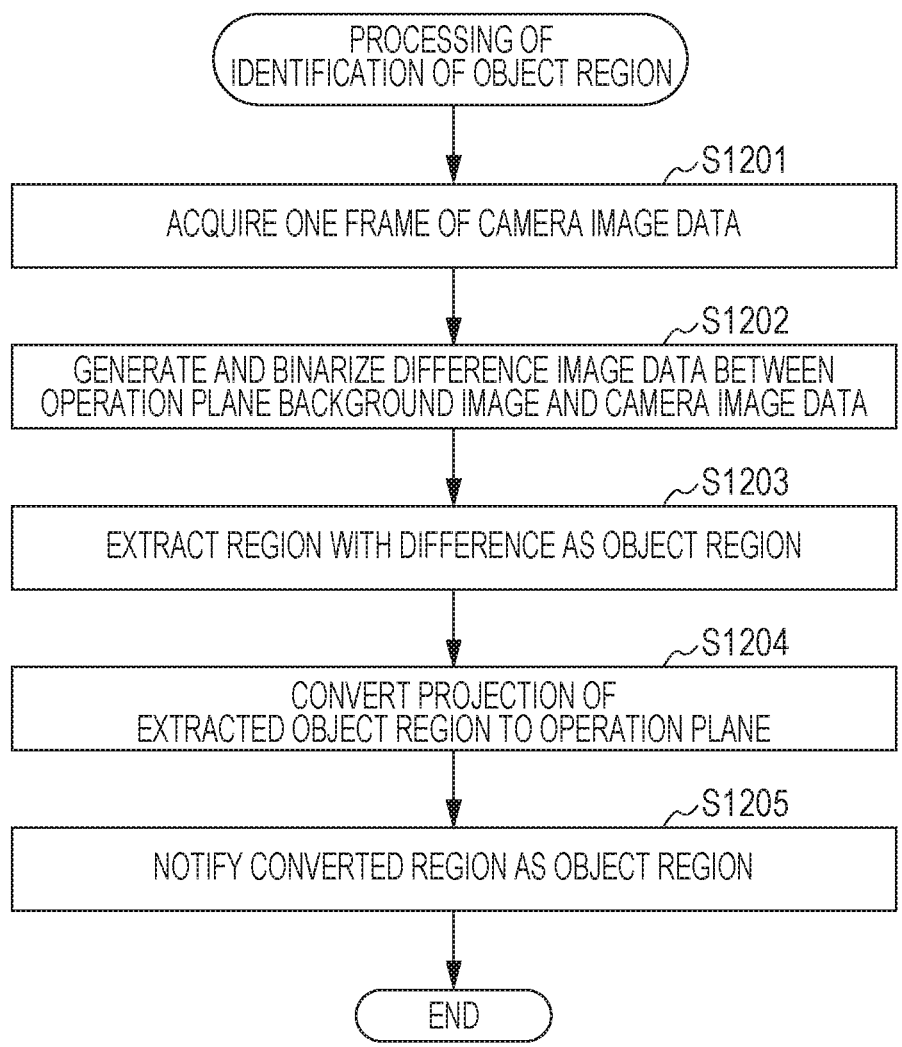
FIG. 12 is a flowchart illustrating processing for determining a region of an object placed on an operating surface by an object detection unit according to a second embodiment of the present invention.

FIG. 12 is a flowchart illustrating processing in which an object detection unit 410 according to the second embodiment of the present invention determines a region of an object placed on the operating surface 204. This processing may be implemented by the CPU 302 functioning as the object detection unit 410, and a program executing the processing is stored in the HDD 305. The CPU 302 decompresses the program to the RAM 304 and executes it. Therefore, the following descriptions assume that the subject of the processing in steps is the CPU 302.

In this processing, if an object is placed on the operating surface 204, the object detection unit 410 is assumed to determine a region where the object is placed on the operating surface 204. This processing is started in response to a detection that an object is placed on the operating surface 204. First in S1201, the CPU 302 acquires camera image data for one frame from the image acquisition unit 416. Next, in S1202, the CPU 302 generates difference image data between the operating surface background image and the camera image data in the same manner as in S922 in FIGS. 9A and 9B. The difference image data is then binarized. Next, in S1203, the CPU 302 extracts a region having a difference from the binary image data acquired in S1202 (such as a region with binary image data "1") as an object region. Next, in S1204, the CPU 302 converts coordinate information regarding the object region extracted in S1203 to a two-dimensional point set in a Cartesian coordinate system of the operating surface 204. Then, in S1205, the CPU 302 notifies the converted region as an object region to the main control unit 402, and the processing ends.

Figure 13:
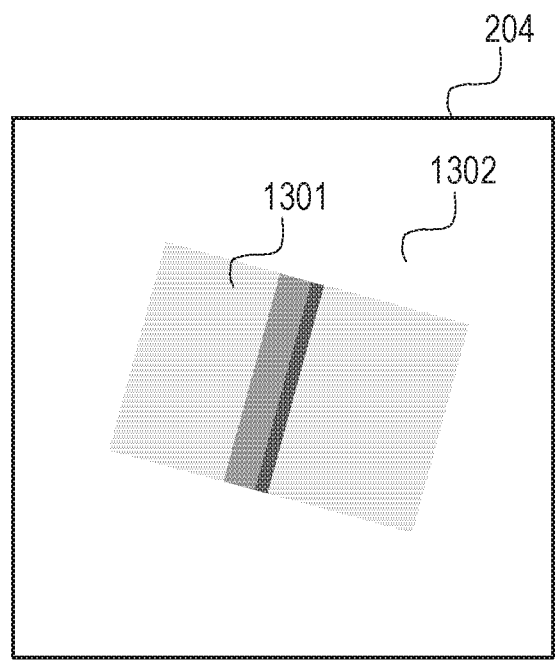
FIG. 13 illustrates a division example of a region of an operating surface into an object region and a non-object region according to the second embodiment.

FIG. 13 illustrates an example in which a region of the operating surface 204 is divided into an object region 1301 and a non-object region 1302 according to the second embodiment.

Figure 14:
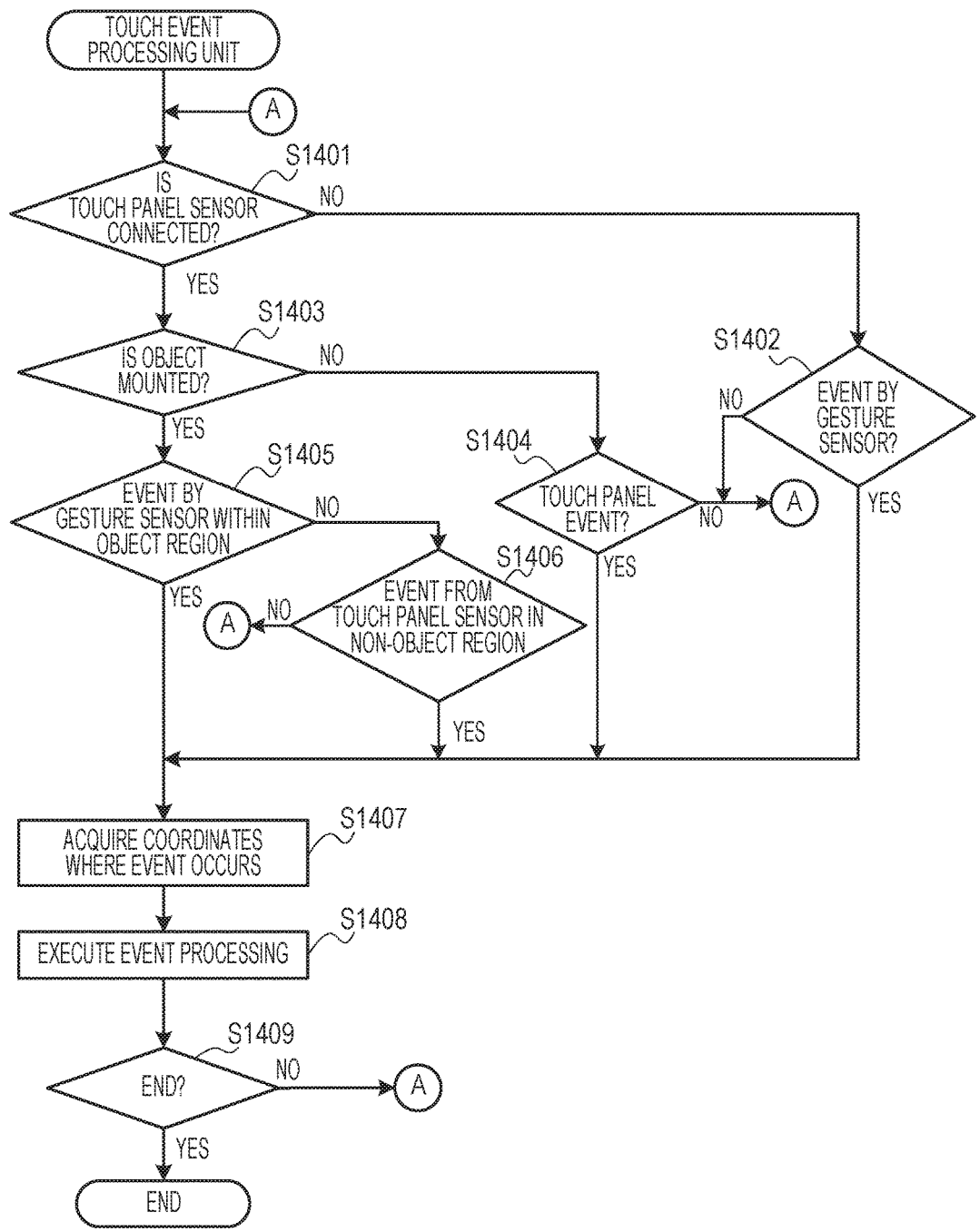
FIG. 14 is a flowchart illustrating processing to be performed by a controller unit according to the second embodiment.

FIG. 14 is a flowchart illustrating processing to be performed by the controller unit 201 according to the second embodiment. Control will be described which changes the gesture recognition processing within the operating surface 204 between the object region 1301 and the non-object region 1302. A program executing the processing is stored in the HDD 305. The CPU 302 decompresses the program to the RAM 304 and executes it. Therefore, the following descriptions assume that the subject of the processing in steps is the CPU 302.

First in S1401, the CPU 302 determines whether the touch panel sensor 330 is connected or not in the same manner as in S1103 in FIG. 11 according to the first embodiment. If it is determined that the touch panel sensor 330 is not connected, the processing moves to S1402 where whether there is any event from a gesture sensor being the distance image sensor unit 208 or not is determined. In S1402, if the CPU 302 determines that there is no event from the gesture sensor, the processing moves to S1401. If the CPU 302 determines that there is an event from the gesture sensor in S1402, the processing moves to S1407. In S1407, the CPU 302 acquires coordinates at which the event occurs in the same manner as in S1106 in FIG. 11. The processing then moves to S1408.

On the other hand, if the CPU 302 in S1401 determines that the touch panel sensor 330 is connected, the processing moves to S1403 where the CPU 302 determines whether any object is placed within the operating surface 204 or not. If it is determined that no object is placed, the processing moves to S1404 where whether there is any event from the touch panel sensor 330 or not is determined. If not, the processing moves to S1401. On the other hand, if there is an event from the touch panel sensor 330, the processing moves to S1407.

If the CPU 302 in S1403 determines that an object is placed within the operating surface 204, the processing moves to S1405 where the CPU 320 determines whether there is an event from a gesture sensor within the object region 1301. If it is determined here that there is no event from the gesture sensor, the processing moves to S1406 where whether there is an event from the touch panel sensor 330 in the non-object region 1302 is determined. If it is determined here that there is no event from the touch panel sensor 330, the processing moves to S1401. If it is determined that there is an event from the touch panel sensor 330, the processing moves to S1407.

If the CPU 302 determines in S1405 that there is an event from the gesture sensor within the object region 1301, the processing moves to S1407. In S1407, the CPU 302 acquires information on coordinates at which the event occurs. The processing then moves to S1408 where event processing is performed in the same manner as in S1109 according to the first embodiment. The processing then moves to S1409. In S1409, the CPU 302 determines whether the processing is to be ended or not. If not, the processing moves to S1401. If so in S1409, the processing ends.

According to the second embodiment as described above, when the touch panel sensor 330 is connected and an object is placed on an operating surface, coordinates designated in the region of the object are detected by using a gesture sensor rather than a touch panel sensor. The event coordinates are detected by the touch panel sensor 330 in an operating surface excluding the object region. Thus, even when a plurality of sensors is provided which are capable of recognizing a gesture on the operating surface, processing for detecting a gesture by a sensor can be performed simply and quickly, which allows execution of the processing for recognizing designated coordinates with higher precision.

According to the aforementioned embodiments as described above, a touch operation performed by a user may be detected with higher precision advantageously.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2015-254870, filed Dec. 25, 2015, which is hereby incorporated by reference herein in its entirety.

What is claimed is:

1. An operating apparatus comprising:
an image acquisition unit configured to capture an image on an operating surface and acquire image data;
a recognition unit configured to recognize a gesture performed by a user on the operating surface on the basis of the image data;
a determination unit configured to determine whether a touch panel sensor configured to detect positions touched by a user on the operating surface is connected or not; and
a control unit configured to recognize a touch operation, in a case where the determination unit determines that the touch panel sensor is connected on the basis of a position detected by the touch panel sensor, and to recognize a gesture operation based on a user's gesture recognized by the recognition unit, in a case where the determination unit determines that the touch panel sensor is not connected.

2. The operating apparatus according to claim 1, wherein the image acquisition unit includes a visible light camera, an infrared camera, and a three-dimensional distance sensor.

3. The operating apparatus according to claim 2, wherein the image data includes R, G, B values of each pixel of the data and a distance from the infrared camera to each of the pixels.

4. The operating apparatus according to claim 1, wherein the recognition unit is configured to detect a shape of a hand of the user from the image data and to recognize the number of fingers of the user, coordinates designated by the finger or fingers, and a gesture performed by the finger or fingers from the shape of the hand.

5. The operating apparatus according to claim 4, wherein, in a case where the distance between the finger or fingers and the operating surface is equal to or lower than a predetermined value, the recognition unit is configured to recognize that the gesture performed by the finger or fingers of the user is a touch operation by the finger or fingers.

6. The operating apparatus according to claim 1, further comprising an object detection unit configured to detect whether an object is mounted on the operating surface or not on the basis of the image data.

7. The operating apparatus according to claim 6, wherein the object detection unit is configured to detect that an object is placed on the operating surface in a case where there are a plurality of serial frames having a state that a difference value between an initial image of the operating surface and the image data is equal to or higher than a predetermined value.

8. The operating apparatus according to claim 6, wherein the control unit is configured to identify coordinates of a position on the operating surface touched by the user on the basis of coordinates of the gesture recognized by the recognition unit in a region detected by the object detection unit as having an object placed on the operating surface even when the determination unit determines that there is the touch panel sensor on the operating surface.

9. The operating apparatus according to claim 6, wherein the control unit is configured to identify coordinates of a position on the operating surface touched by the user on the basis of coordinates of the position detected by the touch panel sensor on an operating surface excluding a region detected by the object detection unit as having an object placed on the operating surface in the case that the determination unit determines that there is the touch panel sensor on the operating surface.

10. A control method for controlling an operating apparatus, the method comprising:
capturing an image on an operating surface and acquiring image data;
recognizing a gesture performed by a user on the operating surface on the basis of the image data;
determining whether a touch panel sensor configured to detect positions touched by a user on the operating surface is connected or not; and
recognizing a touch operation, in a case where the determining determines that the touch panel sensor is connected on the basis of a position detected by the touch panel sensor, and recognizing a gesture operation based on a user's gesture recognized by the recognizing, in a case where the determining determines that the touch panel sensor is not connected.

11. A storage medium storing a program which, when run on a device, causes the device to execute a method for controlling an operating apparatus, the method comprising:

capturing an image on an operating surface and acquiring image data;
recognizing a gesture performed by a user on the operating surface on the basis of the image data;
determining whether a touch panel sensor configured to detect positions touched by a user on the operating surface is connected or not; and
recognizing a touch operation, in a case where the determining determines that the touch panel sensor is connected on the basis of a position detected by the touch panel sensor, and recognizing a gesture operation based on a user's gesture recognized by the recognizing, in a case where the determining determines that the touch panel sensor is not connected.

\* \* \* \* \*